United States Patent
Kim et al.

(10) Patent No.: US 8,767,645 B2
(45) Date of Patent: Jul. 1, 2014

(54) METHOD OF RADIO RESOURCE ALLOCATION AND METHOD OF NEIGHBOR INFORMATION TRANSMISSION IN WIRELESS COMMUNICATION SYSTEM

(75) Inventors: Young Yong Kim, Seongnam-si (KR); Kang Jin Yoon, Seoul (KR); Jae Won Lim, Anyang-si (KR); Chung Ha Koh, Seoul (KR); Kyung Min Park, Seoul (KR); Byoung Hoon Kim, Anyang-si (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 320 days.

(21) Appl. No.: 13/133,642

(22) PCT Filed: Dec. 7, 2009

(86) PCT No.: PCT/KR2009/007272
§ 371 (c)(1),
(2), (4) Date: Aug. 26, 2011

(87) PCT Pub. No.: WO2010/067998
PCT Pub. Date: Jun. 17, 2010

(65) Prior Publication Data
US 2011/0299488 A1 Dec. 8, 2011

(30) Foreign Application Priority Data
Dec. 8, 2008 (KR) .................. 10-2008-0123947

(51) Int. Cl.
*H04W 4/00* (2009.01)
*H04W 72/04* (2009.01)
*H04W 28/02* (2009.01)
*H04W 16/16* (2009.01)

(52) U.S. Cl.
CPC ...... *H04W 72/0426* (2013.01); *H04W 28/0236* (2013.01); *H04W 16/16* (2013.01); *H04W 72/0473* (2013.01)
USPC ............................ 370/329; 370/328; 455/449

(58) Field of Classification Search
None
See application file for complete search history.

(56) References Cited

U.S. PATENT DOCUMENTS

| 6,070,075 A | 5/2000 | Kim |
| 2002/0082021 A1* | 6/2002 | Chen et al. ................. 455/450 |

(Continued)

FOREIGN PATENT DOCUMENTS

| KR | 1020030056143 | 7/2003 |
| KR | 1020030060508 | 7/2003 |

*Primary Examiner* — Kevin C Harper
*Assistant Examiner* — Peter Chen
(74) *Attorney, Agent, or Firm* — Lee, Hong, Degerman, Kang & Waimey (57) ABSTRACT

A method for radio resource allocation in a wireless communication system comprises the steps of: receiving a channel indicator for indicating the frequency band used by a neighboring base station from a gateway that controls at least one base station that accesses the core network of a wireless communication system via an IP network; assigning to an available channel list a frequency band remaining after the frequency band indicated by said channel indicator is excluded from the entire frequency band, wherein said entire frequency band is divided into a plurality of frequency bands, and said channel indicator comprises indices that indicate respective frequency bands; and selecting, as one's own channel, at least one frequency band from said available channel list. The method enables finding of frequency bands which are used by neighboring base stations, and selection and use of a frequency band which is not used by neighboring base stations, and thus can reduce the interference between neighboring base stations, and efficiently use limited wireless resources.

5 Claims, 8 Drawing Sheets

(56) References Cited

U.S. PATENT DOCUMENTS

| | | |
|---|---|---|
| 2002/0107020 A1 | 8/2002 | Lee |
| 2007/0184869 A1* | 8/2007 | Koo et al. .................... 455/522 |
| 2009/0047931 A1* | 2/2009 | Nanda et al. ................. 455/411 |
| 2009/0088185 A1* | 4/2009 | Beale .......................... 455/458 |
| 2009/0131070 A1* | 5/2009 | Tajima et al. ................. 455/455 |
| 2009/0233617 A1* | 9/2009 | Bjarnason et al. ......... 455/452.2 |
| 2010/0080180 A1* | 4/2010 | Tortora ....................... 370/329 |
| 2010/0260068 A1* | 10/2010 | Bhatt et al. ................... 370/254 |

\* cited by examiner

METHOD OF RADIO RESOURCE ALLOCATION AND METHOD OF NEIGHBOR INFORMATION TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2009/007272, filed on Dec. 7, 2009, which claims the benefit of earlier filing date and right of priority to Korean Patent Application No. 10-2008-0123947, filed on Dec. 8, 2008, the contents of which are all hereby incorporated by reference herein in their entirety.

FIELD OF THE INVENTION

The present invention relates to wireless communication, and more specifically to a method of transmitting neighboring information between neighboring base stations and allocating radio resources.

RELATED ART

With the development of communication and the propagation of multimedia technology, a variety of high-capacity transmission technologies are being applied to wireless communication systems. As a method of increasing the wireless capacity, there is a method of allocating greater frequency resources. However, to allocate limited frequency resources to a plurality of users is limited. As a method of utilizing the limited frequency resources more efficiently, there is a method of making smaller the size of a cell. If the size of a cell is made smaller, a base station can allocate greater frequency resources to users because the number of users served by the base station is reduced. If the size of a cell is made smaller, high-capacity service of a better state can be provided to a plurality of users.

Active research is recently being done on technology for femto cells installed at homes or offices. The femto cell refers to a micromini-mobile communication base station which is used in rooms, such as homes or offices. The femto cell is connected to an IP network provided at the home or the office and configured to access the core network of a mobile communication system over the IP network and to provide mobile communication service. A user who uses the mobile communication system can be provided with service through the existing macro cell outdoors and can be provided with service through the femto cell indoors. The femto cell can improve the indoor coverage of a mobile communication system by supplementing the fact that the service of the existing macro cell is degraded within a building and can provide voice service and data service of a high quality because it can provide service to only specific users.

Methods of allocating the frequency band of a femto cell disposed within the cell coverage of a macro cell include a co-channel method, a partial co-channel method, and a dedicated channel method. The co-channel method is a method of allocating the same frequency band as a macro cell as the frequency band of a femto cell. Control of transmission power of the femto cell is important in order to reduce interference which may occur because the macro cell and the femto cell use the same frequency band. The partial co-channel method is a method of allocating some frequency bands of the macro cell to a co-channel also used by the femto cell. When interference is generated in the co-channel, interference can be reduced because a user who uses the macro cell is served through frequency bands other than the co-channel. The dedicated channel method is a method of the macro cell and the femto cell using different frequency bands. Interference between the macro cell and the femto cell can be greatly reduced, but limited frequency resources may not be efficiently used.

A femto cell is a small base station which is purchased by a user and installed at his office or home, and thus it is difficult for a mobile communication service provider to limit the placement of the femto cells in terms of a policy. Accordingly, there is a need for a method of reducing interference between the femto cells randomly disposed. In order to reduce interference between the femto cells, transmission power of the femto cell may be limited, which may degrade service of the femto cell because the coverage of the femto cell is reduced. If different frequency bands are used between neighboring femto cells, interference between the femto cells can be greatly reduced and the coverage of the femto cell can be guaranteed. The femto cells must be able to use frequency resources to the highest degree while neighboring femto cells use different frequency bands.

There is a need for a method of neighboring femto cells using different frequency bands so that interference between the femto cells can be reduced and the femto cells can use the frequency resources to the highest degree.

SUMMARY OF THE INVENTION

The present invention provides a method of allocating radio resources and a method of transmitting neighboring information, wherein neighboring femto cells can use different frequency bands.

In an aspect, A method of allocating radio resources in a wireless communication system includes receiving a channel indicator, indicating a frequency band used by a neighboring base station, from a gateway managing at least one base station which accesses a core network of the wireless communication system over an IP network, assigning remaining frequency bands other than the frequency band, indicated by the channel indicator, in the entire frequency band to an available channel list, wherein the entire frequency band is classified into a plurality of frequency bands, and the channel indicator consists of an index indicating each of the plurality of frequency bands, and selecting at least one frequency band from the available channel list as one's own channel.

In another aspect, a method of transmitting neighboring information using a gateway managing a plurality of base stations in a wireless communication system includes receiving first channel information from one of the plurality of base stations, and transmitting second channel information to at least one of the plurality of base stations in response to the first channel information, wherein the second channel information comprises a channel indicator indicating a frequency band used by a neighboring base station.

Unused frequency bands can be selected and used because frequency bands used by neighboring base stations are checked. Accordingly, interference between neighboring base stations can be reduced, and limited radio resources can be used efficiently.

DESCRIPTION OF EXEMPLARY EMBODIMENTS

Figure 1:
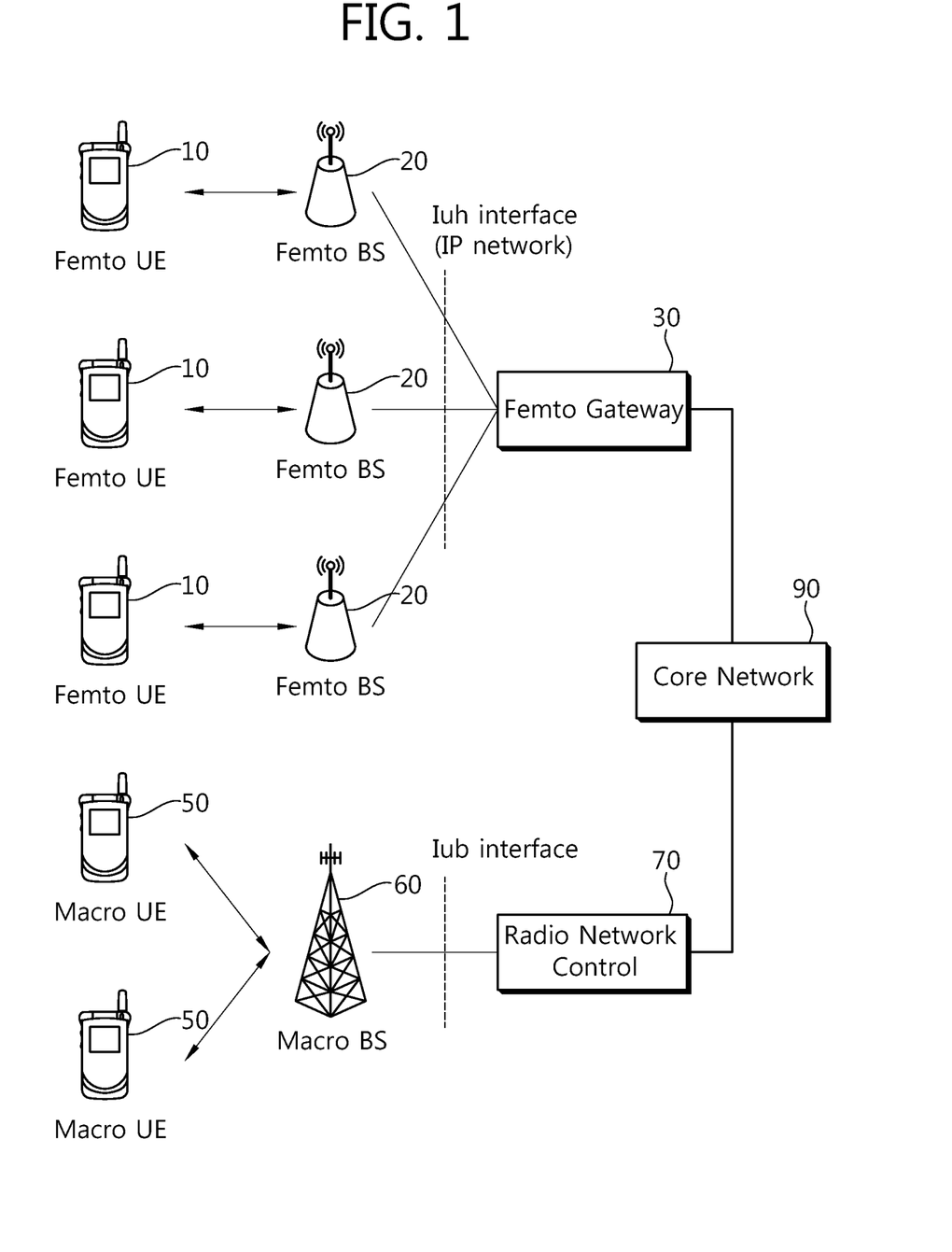
FIG. 1 is a block diagram showing a wireless communication system.

FIG. 1 is a block diagram showing a wireless communication system. The wireless communication systems are widely deployed in order to provide various communication services, such as voice and packet data.

Referring to FIG. 1, the common wireless communication system includes User Equipments (UEs) and Base Stations (BSs). The UE may be fixed or mobile and may be referred to as another terminology, such as a Mobile Station (MS), a User Terminal (UT), a Subscriber Station (SS), or a wireless device. The BS typically refers to a fixed station communicating with UEs, and it may be referred to as another terminology, such as a Node-B, a Base Transceiver System (BTS), or an access point.

One or more cells may exist in one BS.

The BSs may be classified into femto BSs 20 and a macro BS 60 according to the cell coverage or the deployment method. The cell of the femto BS 20 is smaller in size than the cell of the macro BS 60. Part of or the entire cell of the femto BS 20 may overlap with the cell of the macro BS 60. The femto BS 20 may be referred to another terminology, such as a femto cell, a home node-B, or a closed subscriber group (CSG). The macro BS 60 may be referred to another terminology, such as a macro cell differently from the femto cell.

The femto BS 20 is connected to a femto gateway 30 through an Iuh interface. The Iuh interface refers to an interface between the femto BS 20 and the femto gateway 30 over an IP network. The femto gateway 30 is an entity managing at least one femto BS 20. The femto gateway 30 may perform the registration of the femto BS 20 and certification and security procedures such that the femto BS 20 can access the core network 90 of a wireless communication system. The macro BS 60 is connected to a Radio Network Controller (RNC) 70 through an Iub interface. The RNC 70 is an entity managing at least one macro BS 60 and connects the macro BS 60 to the core network 90. The macro BS 60 is connected to the core network 90 through a dedicated line, whereas the femto BS 20 is connected to the core network 90 through an IP network.

A UE accessing the femto BS 20 is called a femto UE 10, and a UE accessing the macro BS 60 is called a macro UE 50. The femto UE 10 may become the macro UE 50 through handover to the macro BS. The macro UE 50 may become the femto UE 10 through handover to the femto BS.

Hereinafter, downlink means transmission from a BS to a UE, and uplink means communication from a UE to a BS. In downlink, a transmitter may be part of a BS, and a receiver may be part of a UE. In uplink, a transmitter may be part of a UE, and a receiver may be part of a BS.

There is no limit to a multi-access scheme applied to the wireless communication system. Various multi-access schemes, such as Code Division Multiple Access (CDMA), Time Division Multiple Access (TDMA), Frequency Division Multiple Access (FDMA), Single-Carrier FDMA (SC-FDMA), and Orthogonal Frequency Division Multiple Access (OFDMA), may be used.

Figure 2:
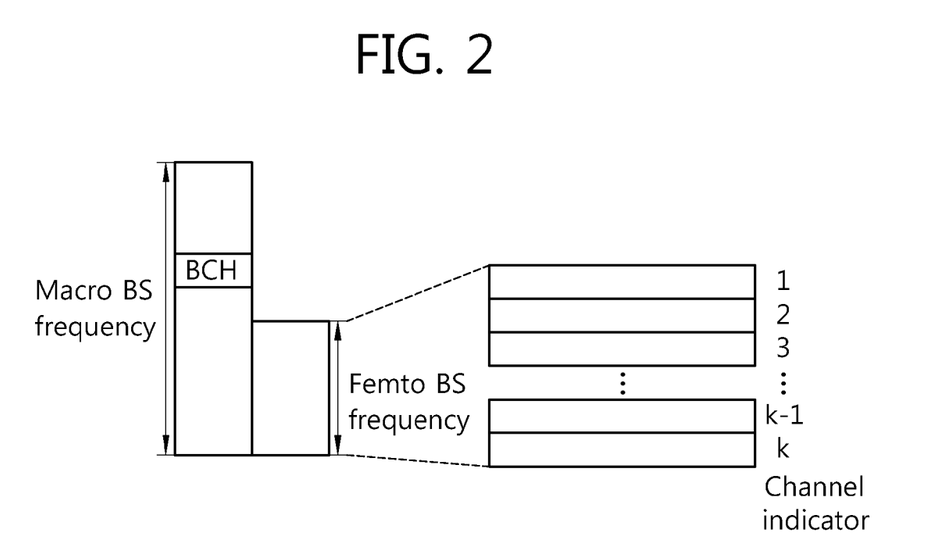
FIG. 2 shows radio resources allocated to a femto BS according to an embodiment of the present invention.

FIG. 2 shows radio resources allocated to a femto BS according to an embodiment of the present invention.

Referring to FIG. 2, some of the frequency bands of a macro BS may be shared by a femto BS. This is called a partial co-channel method. It is assumed that the frequency band shared by the macro BS and the femto BS is called a co-channel region and a frequency band used by only the macro BS is a macro channel region. The broadcast channel (BCH) of the macro BS is allocated to the macro channel region. System information about the macro BS is transmitted through the broadcast channel. The femto BS may receive the system information of the macro BS as occasion demands.

A method of allocating the frequency band of a femto BS to a macro BS is illustrated to be the partial co-channel method, but not limited thereto. A co-channel method or a dedicated channel method may be used. The co-channel method is a method in which all the frequency bands of a macro BS are shared by a femto BS. The dedicated channel method is a method in which a frequency band different from a frequency band used by a macro BS is used by a femto BS. In the present invention, as a method in which a frequency band used by a femto BS does not overlap with frequency bands used by neighboring femto BSs, all methods of allocating the frequency band of a femto BS to a macro BS, such as the co-channel method, the partial co-channel method, and the dedicated channel method, may be used. The neighboring femto BS refers to a femto BS having a cell region not overlapped.

The entire frequency band of a femto BS is divided into a plurality of frequency bands. One frequency band includes at least one subcarrier. The frequency band may be a basic unit of radio resources allocated to a UE. For example, the frequency band may correspond to a resource block or a sub-channel composed of a plurality of subcarriers. Alternatively, the frequency band may be a basic unit of radio resources allocated to one femto BS. One frequency band may include a plurality of resource blocks or a plurality of subchannels. The frequency band may be said to be a channel through which wireless communication service for one user is provided. Each frequency band may be indicated by a channel indicator. The channel indicator is an indicator to distinguish a plurality of frequency bands from each other. The channel indicator may consist of an index indicating each frequency band. A femto BS informs a femto gateway of a frequency band, used by the femto BS, using a channel indicator. A femto gateway informs a femto BS of a frequency band, used by another femto BS, using a channel indicator. A femto gateway can check information about frequency bands, used by femto BSs connected thereto, using channel indicators. When neighboring femto BSs use the same frequency band, the femto gateway may inform the femto BSs of the fact using the channel indicators. A femto BS may inform a UE of radio resources, allocated to the UE, using a channel indicator when allocating the radio resources to the UE.

Figure 3:
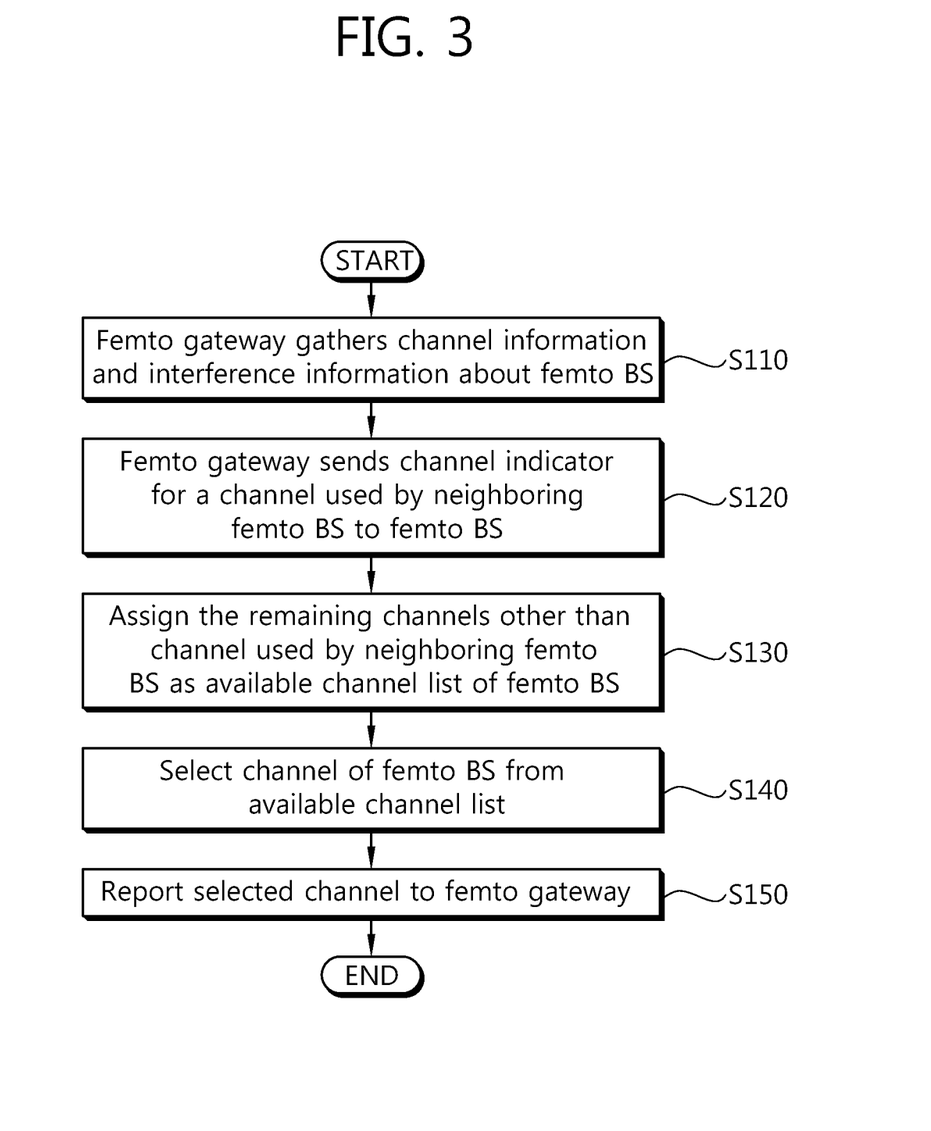
FIG. 3 shows a method of transmitting neighboring information using a femto gateway according to an embodiment of the present invention.

FIG. 3 shows a method of transmitting neighboring information using a femto gateway according to an embodiment of the present invention.

Referring to FIG. 3, a femto gateway gathers channel information and interference information about a femto BS at step S110. The femto gateway may receive a channel indicator for a frequency band, being used by the femto BS or wanted to be used by the femto BS, from the femto BS and know the channel information about the femto BS based on the received channel indicator. The femto gateway may know position information about femto BSs over an IP network and may predict interference between neighboring femto BSs when the femto BSs use the same frequency bands.

The femto gateway transmits channel indicators for frequency bands, used by neighboring femto BSs, to the femto BS at step S120. The femto gateway may inform the frequency bands, used by the neighboring femto BSs, using the channel indicators through self-organization in response to a frequency band request from a femto BS which first accesses the femto gateway. Alternatively, the femto gateway may inform the femto BS of the channel indicators for the frequency bands, used by the neighboring femto BSs, on a periodic basis or whenever an event is generated.

The femto BS designates the remaining frequency bands other than the frequency bands, used by the neighboring femto BSs, as an available channel list that may be used by the femto BS at step S130. The available channel list means a list of the frequency bands that may be used by the femto BS. The available channel list may consist of channel indicators indicating frequency bands belonging to the frequency band of the femto BS.

The femto BS selects its own frequency band from the frequency bands included in the available channel list at step S140. The femto BS may randomly select the frequency band to be used from the available channel list. Alternatively, the femto BS may select an unused frequency band having a good channel state from the available channel list by measuring signals from a neighboring BS or a neighboring UE. Alternatively, the femto BS may select a frequency band having a good channel state from the available channel list according to a measurement report made by a UE.

The femto BS reports the selected frequency band to the femto gateway at step S150. If a frequency band to be newly used is selected, the femto BS reports a channel indicator for the selected frequency band to the femto gateway. That is, if its own frequency band is changed, the femto BS may transmit a channel indicator for the changed frequency band to the femto gateway. The femto BS may transmit the channel indicator for its own frequency band to the femto gateway on a periodic basis or in response to a request from the femto gateway.

When the process from the step (S110) of the femto gateway gathering channel information from a femto BS through a channel indicator to the step (S150) of the femto BS reporting a selected frequency band using the channel indicator is repeated, neighboring femto BSs can be prevented from using the same frequency band and each femto BS can utilize radio resources to the highest degree.

Figure 4:
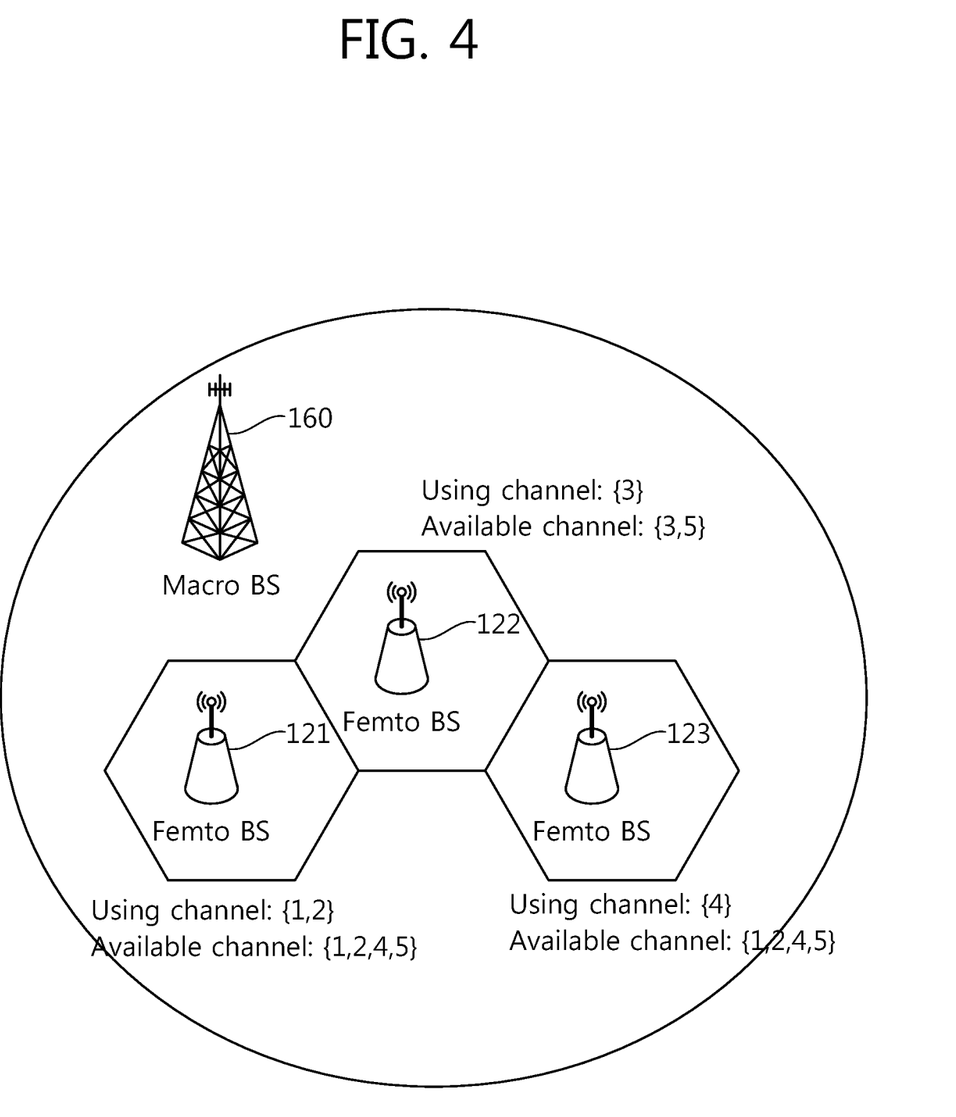
FIG. 4 shows an example in which neighboring femto BSs use radio resources.

FIG. 4 shows an example in which neighboring femto BSs use radio resources.

Referring to FIG. 4, a femto gateway transmits channel indicators for frequency bands, used by neighboring femto BSs, to the neighboring femto BSs such that the neighboring femto BSs do not use the same frequency band. The available channel list of a femto BS includes frequency bands other than frequency bands used by neighboring femto BSs. The femto BS may use frequency bands different from the frequency bands, used by the neighboring femto BS, based on the available channel list.

When three femto BSs 121, 122, and 123 are deployed in a macro BS 160, it is assumed that the first femto BS 121 is adjacent to the second femto BS 122, the second femto BS 122 is adjacent to the third femto BS 123, and the third femto BS 123 and the first femto BS 121 are not adjacent to each other. Assuming that a range of frequency bands that may be used by a femto BS is {1,2,3,4,5}, if the second femto BS 122 uses the frequency band {3}, an available channel list for the first femto BS 121 and the third femto BS 123 is {1,2,4,5}. If the first femto BS 121 selects and uses the frequency bands {1,2} from the available channel list and the third femto BS 123 selects and uses the frequency band {4} from the available channel list, an available channel list for the second femto BS 122 is {3,5}.

If the second femto BS 122 further selects and uses the frequency band {5} from the available channel list, a femto gateway informs the first femto BS 121 and the third femto BS 123 of the selected frequency band {5}. The available channel list of the first femto BS 121 and the third femto BS 123 is changed to {1,2,4}.

Figure 5:
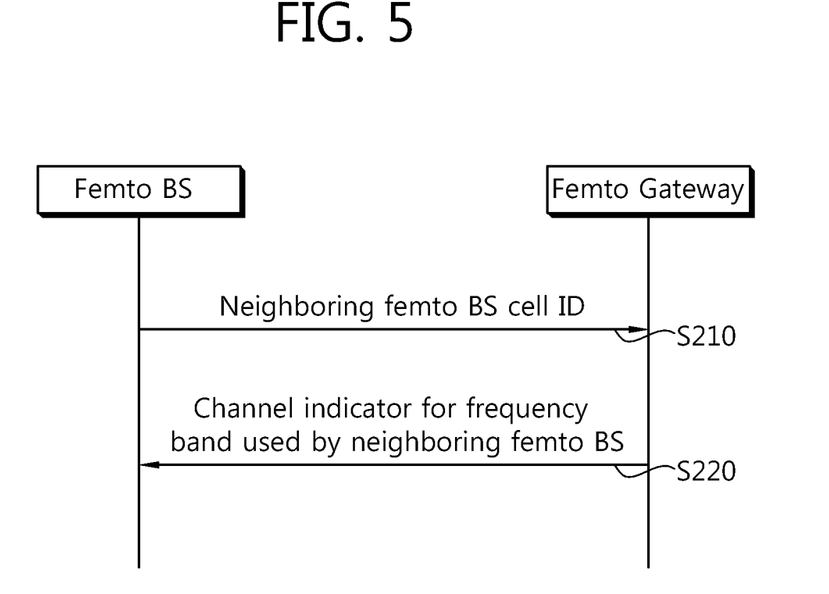
FIG. 5 shows a method of transmitting neighboring information using a femto gateway according to another embodiment of the present invention.

FIG. 5 shows a method of transmitting neighboring information using a femto gateway according to another embodiment of the present invention.

Referring to FIG. 5, a femto BS has to have an available channel list in order to use different frequency bands from neighboring femto BS. The femto BS performing initial self-organization has to newly organize an available channel list. Alternatively, an available channel list may be needed to be updated owing to increased interference with a neighboring femto BS or the appearance of a new neighboring femto BS.

If the available channel list needs to be newly organized or to be updated, the femto BS transmits the cell ID of a neighboring femto BS to the femto gateway at step S210. The femto BS may obtain a neighbor cell list based on channel measurement or a measurement report from a UE. The neighbor cell list may consist of the cell ID of the neighboring femto BS.

When the cell ID of the neighboring femto BS is received from the femto BS, the femto gateway transmits a channel indicator for a frequency band, used by the neighboring femto BS, to the femto BS at step S220. The femto gateway may inform the frequency band used by the femto BS, corresponding to the cell ID of the neighboring femto BS, using the channel indicator because it knows the frequency band used by the femto BS managed by the femto gateway. The femto BS may organize an available channel list, including frequency bands other than the frequency band used by the neighboring femto BS in the entire frequency band, and select and use a proper frequency band from the available channel list.

Equation 1 shows a method of generating an available channel list.

$$A_j = N - \bigcup_{i \in NC_j} U_i \quad \text{[Equation 1]}$$

Here, $A_j$ is a frequency band that may be used by a femto $BS_j$, N is the entire frequency band of the femto BS, $NC_j$ is a cell ID group of femto BSs adjacent to the femto $BS_j$, and $U_i$ is a frequency band used by a femto $BS_i$. That is, the available channel list consists of the remaining frequency bands other than frequency bands, used by neighboring femto BS, in the entire frequency bands.

Figure 6:
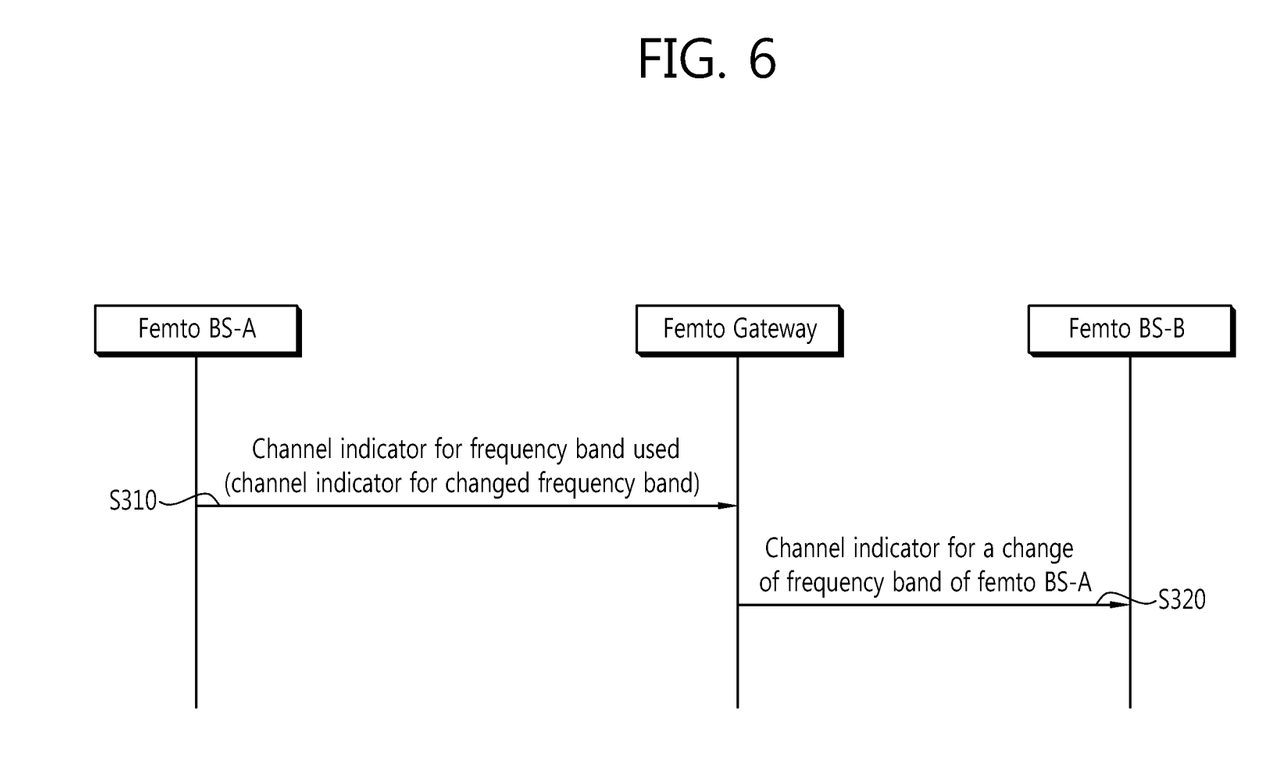
FIG. 6 shows a method of transmitting neighboring information using a femto gateway according to yet another embodiment of the present invention.

FIG. 6 shows a method of transmitting neighboring information using a femto gateway according to yet another embodiment of the present invention.

Referring to FIG. 6, a femto BS-A reports information about a frequency band, selected from an available channel list and used, to a femto gateway at step S310. The femto BS-A may inform the information about the used frequency band using a channel indicator. The femto BS-A may transmit channel indicators for all its own frequency bands or may transmit a channel indicator for a frequency band which is newly used or not used and changed.

The femto gateway transmits the information about a change of the frequency band of the femto BS-A to a femto BS-B adjacent to the femto BS-A at step S320. The information about a change of the frequency band of the femto BS-A may be transmitted using the channel indicator. The femto BS-B excludes a channel indicator for a frequency band, newly used by the femto BS-A, from an available channel list or adds a channel indicator for a frequency band, not used by the femto BS-A, to the available channel list. That is, a femto BS may obtain information about a change of a frequency band used by a neighboring femto BS through the femto gateway and update its own available channel list.

Meanwhile, a fixed number of frequency bands in the entire frequency bands may be divided and allocated to femto BSs. Assuming that a method of allocating the frequency band of a femto BS using an available channel list according to the present invention is an adaptive channel allocation method, a method of allocating a fixed number of the frequency bands to each femto BS is called a fixed channel allocation method. The adaptive channel allocation method may utilize radio resources more efficiently than the fixed channel allocation method.

Assuming that, in the fixed channel allocation method, a group of frequency bands allocated to a femto $BS_j$ is $K_j$ and a group of frequency bands used by the femto $BS_j$ on average is $U_j$, a relationship between the allocated frequency bands and the used frequency bands may be represented by Equation 2 below.

$$\bigcup_{i \in NC_j} U_i \subset \bigcup_{i \in NC_j} K_i \quad \text{[Equation 2]}$$

$NC_j$ is a cell ID group of femto BSs adjacent to the femto $BS_j$. The group of frequency bands $U_j$ on average used by the femto $BS_j$ is a subset of the group of frequency bands $K_j$ allocated to the femto $BS_j$.

Even in the fixed channel allocation method, the remaining frequency bands other than frequency bands allocated to neighboring femto BSs may be allocated to a femto BS. Accordingly, a group of frequency bands $K_j$ allocated to the femto BS may be represented by Equation 3 below.

$$K_j \subset N - \bigcup_{i \in NC_j} K_i \quad \text{[Equation 3]}$$

When comparing Equations 1 to 3 with each other, the group of frequency bands $K_j$ allocated to the femto BS according to the fixed channel allocation method becomes a subset of the group of frequency bands $A_j$ allocated to the femto BS according to the adaptive channel allocation method. This is because the fixed channel allocation method is based on frequency bands allocated to neighboring femto BSs, whereas the adaptive channel allocation method determines an available channel list based on frequency bands actually used by the neighboring femto BSs. When the frequency bands are allocated according to the adaptive channel allocation method, each femto BS can use the frequency band according to its own traffic. Accordingly, radio resources can be used more efficiently.

If the traffic of any one femto BS is abruptly increased in the area in which femto BSs are crowded, sufficient frequency bands may not be secured. In this case, sufficient frequency bands capable of guaranteeing service quality can be secured in such a way as to adjust an adjacency relationship between the relevant femto BS and neighboring femto BSs by reducing the coverage of the relevant femto BS. A method of adjusting the coverage of a femto BS so that the frequency bands of an available channel list can be sufficiently secured is described below.

Figure 7:
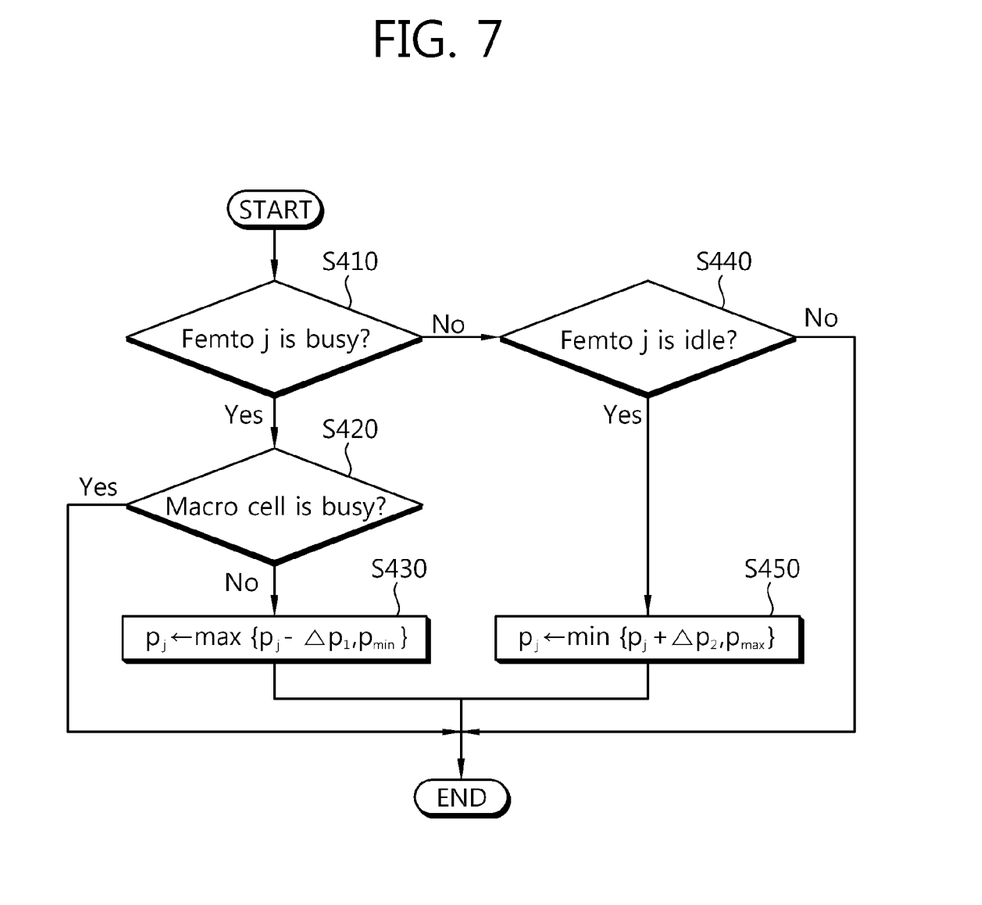
FIG. 7 shows a method of adjusting the cell coverage of a femto BS according to an embodiment of the present invention.

FIG. 7 shows a method of adjusting the cell coverage of a femto BS according to an embodiment of the present invention.

Referring to FIG. 7, the channel states of a macro BS and a femto BS are classified into a busy state and an idle state. The busy state means the case where the number of frequency bands secured in the available channel list of a BS is smaller than or equal to the number of frequency bands for guaranteeing service quality. A criterion for determining the busy state may be determined by the ratio of the number of frequency bands, secured in an available channel list, to the number of frequency bands being used or by the case where the number of frequency bands secured in an available channel list is smaller than a minimum number of frequency bands. The idle state means the case where service quality can be guaranteed by securing sufficient frequency bands in the available channel list of a BS. A channel state of the macro BS may be transmitted to femto BSs through system information or may be transmitted to the femto BSs through a femto gateway. A channel state of the femto BS is managed by the femto gateway and may be transmitted from the femto gateway to a femto BS.

The femto BS checks whether its own channel state is the busy state at step S410. The femto BS checks whether frequency bands enough to satisfy service quality requested by a UE are secured in an available channel list.

If the channel state is the busy state, the femto BS checks a channel state of the macro BS at step S420. This is for checking whether, in order for the femto BS to secure greater frequency bands in the available channel list, the macro BS can consistently provide service to a UE deviated from the cell coverage of the femto BS when the cell coverage of the femto BS is reduced. The femto BS may know the channel state of the macro BS through system information about the macro BS transmitted on a periodic basis or whenever an event is generated. Alternatively, the channel state of the macro BS may be transmitted to the femto BS through a femto gateway. If the channel state of the macro BS is not the busy state, the femto BS reduces the cell coverage. If the channel state of the macro BS is the busy state, the femto BS does not reduce the cell coverage.

If the channel state of the macro BS is not the busy state, the femto BS reduces its transmission power from $P_j$ to $P_j - \Delta P_1$ and sets the transmission power to $\max\{P_j - \Delta P_1, P_{min}\}$. $\Delta P_1$ is an offset in which the transmission power of the femto BS is reduced and may be a specific value or a proportional value. $P_{rim}$ is a minimum transmission power of the femto BS and may be a predetermined value. A UE placed in the reduced cell coverage of the femto BS is provided with service from the macro BS by performing handover to a macro BS having stronger signal intensity. If the cell coverage of the femto BS is reduced, the number of neighboring femto BSs is reduced. Accordingly, the femto BS can secure greater frequency bands in the available channel list. Furthermore, since frequency bands allocated to a user who has performed handover from the femto BS to the macro BS are recovered, the femto BS can secure greater frequency bands in the available channel list, and thus service of higher quality can be provided to a specific user.

Meanwhile, if the channel state of the femto BS is not the busy state, the femto BS checks whether the channel state is the idle state at step S440. The femto BS checks a kind of service provided to a UE and checks whether frequency bands secured in the available channel list is sufficient. If the channel state is the idle state, the femto BS increases the cell coverage. If the channel state is not the idle state, the femto BS does not increase the cell coverage.

If the channel state of the femto BS is the idle state, the femto BS increase its transmission power from $P_j$ to $P_j+\Delta P_2$ and sets the transmission power to $\max\{P_j+\Delta P_2, P_{max}\}$ at step S450. $\Delta P_2$ is an offset in which the transmission power of the femto BS is increased and may be a specific value or a proportional value. $P_{max}$ is a maximum transmission power of the femto BS and may be a predetermined value. If the cell coverage of the femto BS is increased by increasing the transmission power, the femto BS can provide service to larger users. The femto BS can adjust the cell coverage more stably by greatly reducing the cell coverage when reducing the cell coverage and by slightly increasing the cell coverage when increasing the cell coverage. That is, $\Delta P_1$ may be set to be greater than $\Delta P_2$.

The femto BS reduces the cell coverage by checking a channel state of the macro BS. Accordingly, a load of the femto BS can be compensated for by the macro BS. The femto BS can increase service quality by securing greater frequency bands through the readjustment of a relationship with neighboring femto BSs. Furthermore, if the cell coverage of one femto BS is reduced in an environment in which femto BSs are crowded, other neighboring femto BSs can secure greater frequency bands in their available channel lists.

Figure 8:
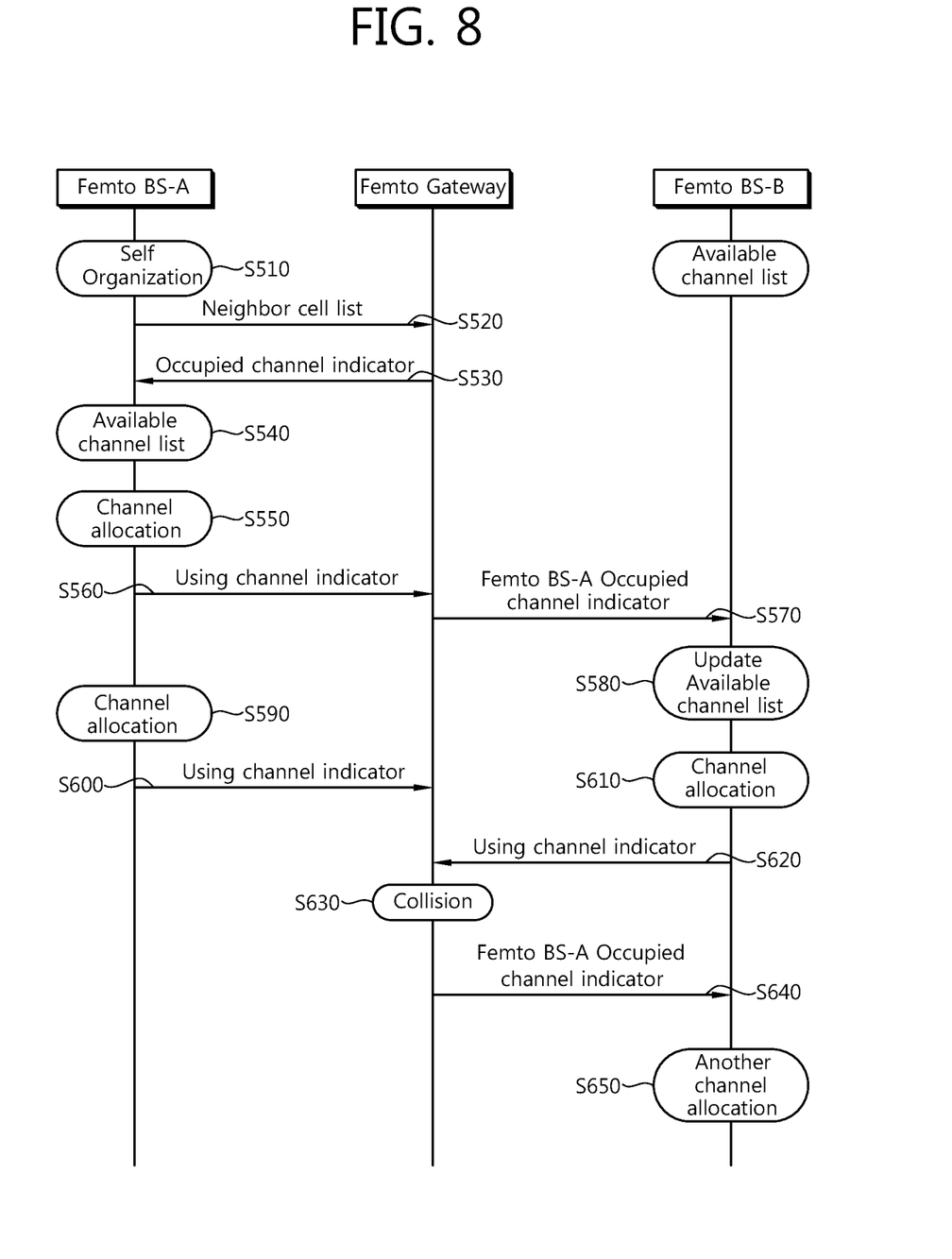
FIG. 8 shows a method of allocating the radio resources of a femto BS and a method of transmitting neighboring information according to an embodiment of the present invention.

FIG. 8 shows a method of allocating the radio resources of a femto BS and a method of transmitting neighboring information according to an embodiment of the present invention.

Referring to FIG. 8, a femto BS-A performs a self-organization process at step S510. The self-organization process is a process in which a femto BS being powered on performs initial setting for providing wireless communication service by performing certification, registration, and security procedures through a femto gateway.

The femto BS-A transmits a neighbor cell list to a femto gateway at step S520. The neighbor cell list may include the cell IDs of neighboring femto BSs placed around the femto BS-A. The femto BS may obtain the neighbor cell list through signal measurement in the self-organization process or may be provided with the neighbor cell list from an upper layer.

The femto gateway transmits an occupied channel indicator for frequency bands, occupied by a relevant femto BS, in the neighbor cell list transmitted by the femto BS-A at step S530. The occupied channel indicator may include the cell IDs of neighboring femto BSs. The femto BS-A may know frequency bands, being used by the neighboring femto BSs, through the occupied channel indicator.

The femto BS-A generates an available channel list at step S540. The femto BS-A includes the remaining frequency bands other than the frequency bands, occupied by the neighboring femto BSs, in the available channel list.

The femto BS-A selects a frequency band through which service will be provided to a UE from the frequency bands included in the available channel list at step S550. The femto BS-A may determine the number of frequency bands according to service requested by the UE and allocates the selected frequency band to the UE.

The femto BS-A informs the femto gateway of the selected frequency band as a using channel indicator at step S560. The using channel indicator indicates the frequency band selected by the femto BS-A. The using channel indicator may include the cell ID of the femto BS-A. Meanwhile, a frequency band being used by the femto BS-A may be released. The using channel indicator may include an indicator of 1 bit, indicating the use or release of each frequency band.

The femto gateway informs a femto BS-B adjacent to the femto BS-A of the frequency band, selected by the femto BS-A, through an occupied channel indicator at step S570. Here, the occupied channel indicator may include the cell ID of the femto BS-A. The occupied channel indicator may include an indicator of 1 bit, indicating the use or release of each frequency band.

The femto BS-B is in the state in which it already has an available channel list. The femto BS-B receives the occupied channel indicator for the femto BS-A from the femto gateway and updates the available channel list at step S580. The femto BS-B excludes the frequency band, selected by the femto BS-A, from the available channel list or adds the selected frequency band to the available channel list. If the occupied channel indicator indicates that the femto BS-A is using the frequency band, the femto BS-B excludes the relevant frequency band from the available channel list. If the femto BS-A instructs the release of the frequency band, the femto BS-B adds the relevant frequency band to the available channel list.

The femto BS-A may select a new frequency band from the available channel list in order to allocate the new frequency band to a UE at step S590. The femto BS-A transmits the using channel indicator, indicating the new frequency band, to the femto gateway at step S600. At this time, the femto BS-B may also select the same frequency band from the available channel list in order to allocate the same frequency band to the UE at step S610. The femto BS-B also transmits a using channel indicator indicative of the selected frequency band to the femto gateway at step S620.

When the using channel indicators for the same frequency band are received from the two neighboring femto BS-A and femto BS-B, the femto gateway detects a collision of frequency bands between the neighboring femto BSs at step S630. If a collision of frequency bands between the neighboring femto BSs is detected, the femto gateway transmits the occupied channel indicator to any one of the two femto BSs at step S640. The femto gateway may first assign priority for the use of the frequency band to a femto BS which has first sent the using channel indicator. Alternatively, the femto gateway may assign priority for the use of the frequency band according to a service state and the number of frequency bands occupied by each femto BS. In the case where priority for the use of a new frequency band is assigned to the femto BS-A, the femto gateway transmits the occupied channel indicator to the femto BS-B.

The femto BS-B selects another frequency band to be allocated to a UE at step S650.

Since neighboring femto BS-A and femto BS-B are prevented from using the same frequency band, interference between the neighboring femto BSs can be reduced. Furthermore, a femto BS can update an available channel list by frequently checking information about frequency bands, being used by neighboring femto BSs, through a femto gateway. Accordingly, a frequency band appropriate for service to be provided to a user can be secured, and a burden of consistently performing neighbor measurement can be reduced.

All the functions described above may be executed by a microprocessor, a controller, a microcontroller, or a processor such as an ASIC (Application Specific Integrated Circuit) according to software or program codes coded to execute the functions. The design, development and/or implementation of the codes may be said to be evident to those skilled in the art based on the description of the present invention.

Although the embodiments of the present invention have been described above, a person having ordinary skill in the art will appreciate that the present invention may be modified and changed in various ways without departing from the technical spirit and scope of the present invention. Accordingly, the present invention is not limited to the embodiments and the present invention may be said to include all embodiments within the scope of the claims below.

What is claimed is:

1. A method of allocating radio resources in a wireless communication system, the method performed by a small base station and comprising:
   receiving, by the small base station, a channel indicator, which indicates a frequency band used by a neighboring base station, from a gateway managing at least one small base station which accesses a core network of the wireless communication system over an IP network;
   generating, by the small base station, an available channel list by recording remaining frequency bands other than the frequency band indicated by the channel indicator among the entire frequency band, wherein the entire frequency band is classified into a plurality of frequency bands, and the channel indicator comprises an index indicating each of the plurality of frequency bands;
   selecting, by the small base station, at least one frequency band from the available channel list as the small base station's own channel;
   checking, by the small base station, whether a number of the remaining frequency bands in the available channel list is greater than or equal to a number of frequency bands for guaranteeing service quality requested by a plurality of user equipments (UEs);
   checking, by the small base station, whether a macro base station is busy if the number of the remaining frequency bands in the available channel list is less than the number of frequency bands for guaranteeing the service quality; and
   reducing, by the small base station, a transmission power, thereby downsizing a cell coverage if the macro base station is not busy and the number of the remaining frequency bands in the available channel list is less than the number of frequency bands for guaranteeing the service quality.

2. The method of claim 1, further comprising
   reporting the selected at least one frequency band to the gateway.

3. The method of claim 1, further comprising:
   transmitting a cell identifier (ID) of the neighboring base station to the gateway; and
   receiving the channel indicator indicating the frequency band used by the neighboring base station that corresponds to the cell ID.

4. The method of claim 1, further comprising:
   selecting another frequency band from the available channel list as the small base station's own channel when the selected at least one frequency band is indicated in the channel indicator received from the gateway.

5. The method of claim 1, wherein a number of frequency bands reserved in the available channel list is increased or decreased by an offset value in which transmission power is controlled by comparing a predetermined criterion.

* * * * *